(12) United States Patent
Faure et al.

(10) Patent No.: US 9,938,025 B2
(45) Date of Patent: Apr. 10, 2018

(54) DEVICE FOR RETAINING A TANK IN AN AIRCRAFT

(71) Applicant: AIRBUS DEFENCE AND SPACE SAS, Les Mureaux (FR)

(72) Inventors: Benjamin Faure, Le Bouscat (FR); Jérôme Bertrand, Saint Aubin de Medoc (FR); Yohann Coraboeuf, Merignac (FR); Samuel Chevrollier, Tarbes (FR); Robert Abadie-La-Haille, Momeres (FR); Pascal Mezieres, Tarbes (FR); Angélique Santerre, Listrac Medoc (FR)

(73) Assignee: AIRBUS DEFENCE & SPACE SAS (FR)

( * ) Notice: Subject to any disclaimer, the term of this patent is extended or adjusted under 35 U.S.C. 154(b) by 217 days.

(21) Appl. No.: 14/765,399

(22) PCT Filed: Feb. 4, 2014

(86) PCT No.: PCT/EP2014/052139
§ 371 (c)(1),
(2) Date: Aug. 3, 2015

(87) PCT Pub. No.: WO2014/122124
PCT Pub. Date: Aug. 14, 2014

(65) Prior Publication Data
US 2015/0360792 A1    Dec. 17, 2015

(30) Foreign Application Priority Data
Feb. 5, 2013 (FR) .................. 13 50988

(51) Int. Cl.
*B64G 1/40* (2006.01)
*B64D 37/30* (2006.01)
(Continued)

(52) U.S. Cl.
CPC ............. *B64G 1/402* (2013.01); *B64D 37/04* (2013.01); *B64D 37/06* (2013.01); *B64D 37/30* (2013.01);
(Continued)

(58) Field of Classification Search
CPC ........ B64D 37/02; B64D 37/04; B64D 37/06; B64D 37/12; B64D 37/30; B64G 1/402; B65D 25/22; B65D 25/24; F16C 11/0695
See application file for complete search history.

(56) References Cited

U.S. PATENT DOCUMENTS 1,943,364 A * 1/1934 Betz ........................... F16J 1/16
                                                      403/128
2,069,996 A * 2/1937 Carleton ................ B64D 37/12
                                                      244/135 R
(Continued)

FOREIGN PATENT DOCUMENTS

DE     1177661      9/1964
DE     10134773     1/2003

OTHER PUBLICATIONS

International Search Report, International Application No. PCT/EP2014/052139, dated May 23, 2014.

*Primary Examiner* — Joseph W Sanderson
(74) *Attorney, Agent, or Firm* — Perman & Green, LLP (57) ABSTRACT

A device for mounting and supporting a generally cylindrical or tapered tank, having a main axis X, that includes a pair of first retaining rods for retaining the tank along a vertical axis Z on each of a first and second end of the tank, a second retaining rod for retaining the tank along a horizontal axis Y, perpendicular to the main axis, on the first end of the tank, and a third retaining rod for retaining in a ball-and-socket joint, the means being located around the vertical axis and connected to the second end of the tank.

22 Claims, 7 Drawing Sheets

(51) Int. Cl.
*F17C 13/00* (2006.01)
*B64D 37/04* (2006.01)
*B64D 37/06* (2006.01)

(52) U.S. Cl.
CPC ............ *F17C 13/00* (2013.01); *F17C 13/008* (2013.01); *F17C 2201/0119* (2013.01); *F17C 2201/054* (2013.01); *F17C 2205/0192* (2013.01); *F17C 2221/08* (2013.01); *F17C 2223/0161* (2013.01); *F17C 2270/0194* (2013.01); *F17C 2270/0197* (2013.01)

(56) References Cited

U.S. PATENT DOCUMENTS

| | | | | |
|---|---|---|---|---|
| 2,764,374 | A * | 9/1956 | Cook, Jr. | B64D 37/12 244/135 R |
| 3,168,014 | A * | 2/1965 | Wilfred | F15B 15/02 248/357 |
| 3,397,855 | A * | 8/1968 | Newland | B64D 27/20 244/54 |
| 3,510,178 | A * | 5/1970 | Sowatzke | F16C 11/0614 384/206 |
| 3,659,817 | A | 5/1972 | Hendal et al. | |
| 3,951,362 | A | 4/1976 | Robinson et al. | |
| 3,966,147 | A * | 6/1976 | Wittko | B64D 37/04 220/905 |
| 3,979,005 | A | 9/1976 | Robinson et al. | |
| 4,065,077 | A * | 12/1977 | Brooks | B64D 27/26 244/54 |
| 4,231,481 | A | 11/1980 | Nash et al. | |
| 4,481,778 | A | 11/1984 | Reinker et al. | |
| 4,557,444 | A | 12/1985 | Jackson et al. | |
| 4,860,972 | A * | 8/1989 | Lannerd | B64D 37/04 244/135 R |
| 5,257,761 | A * | 11/1993 | Ratz | B64G 1/402 156/172 |
| 5,275,357 | A * | 1/1994 | Seelen | B64D 27/26 244/54 |
| 6,123,295 | A * | 9/2000 | Wexler | B64C 1/0009 244/119 |
| 6,330,995 | B1 * | 12/2001 | Mangeiga | B64D 27/26 244/54 |
| 6,361,238 | B1 * | 3/2002 | Schittl | F16C 11/106 248/288.31 |
| 6,843,449 | B1 * | 1/2005 | Manteiga | B64D 27/26 244/54 |
| 7,942,580 | B2 * | 5/2011 | Audart-Noel | B64D 27/26 244/54 |
| 8,348,191 | B2 * | 1/2013 | West | B64D 27/26 244/54 |
| 8,899,255 | B2 * | 12/2014 | Mouton | B64D 29/06 137/15.1 |
| 2003/0085321 | A1 * | 5/2003 | Reniau | F16C 11/068 244/100 R |
| 2007/0138337 | A1 * | 6/2007 | Audart-Noel | B64D 27/26 244/53 R |
| 2011/0308634 | A1 * | 12/2011 | Mouton | B64D 29/06 137/15.1 |
| 2012/0012694 | A1 * | 1/2012 | West | B64D 27/26 244/54 |
| 2014/0064950 | A1 * | 3/2014 | Brochard | F01D 25/24 415/208.1 |
| 2015/0360791 | A1 * | 12/2015 | Chevrollier | B64D 37/30 244/135 R |

\* cited by examiner

DEVICE FOR RETAINING A TANK IN AN AIRCRAFT

CROSS REFERENCE TO RELATED APPLICATIONS

This application is the National Stage of International Application No. PCT/EP2014/052139, having an International Filing Date of 4 Feb. 2014, which designated the United States of America, and which International Application was published under PCT Article 21(s) as WO Publication No. 2014/122124 A1, and which claims priority from and the benefit of French Application No. 1350988, filed 5 Feb. 2013, the disclosures of which are incorporated herein by reference.

BACKGROUND

1. Field

The presently disclosed embodiment relates to a device for retaining a tank in an aircraft and more particularly one suited to holding cryogenic propellant tanks in a fuselage of an aircraft such as an airplane and notably a spaceplane. Such a device, which in the relevant art is referred to as a "supporting device", is notably suited to supporting tanks of cylindrical or conical shape supplying a rocket motor of a spaceplane with propellant.

It affords a solution to applications that require cryogenic liquids to be transported in aircraft under very stringent space and mass constraints and for which usage and test cycles require that the tanks be set down and refitted at short order.

It particularly finds an application in spacecrafts which carry large quantities of cryogenic propellants used for the rocket propulsion of these craft and for which optimizing the dry weight is a prime concern.

2. Brief Description of Related Developments

In the field of space the non-structural cryogenic tanks of rocket stages are conventionally interfaced with the bearing structure of the stage that accommodates them via two skirt-like mounting devices situated above and below the tank.

These devices are designed to allow the tank fixing points to move radially as a result of thermal deformations of the cryogenic tank. The upper interface in this context allows longitudinal movements of the tank fixing points whereas the rear or lower interface on the other hand is longitudinally fixed.

Figure 1:
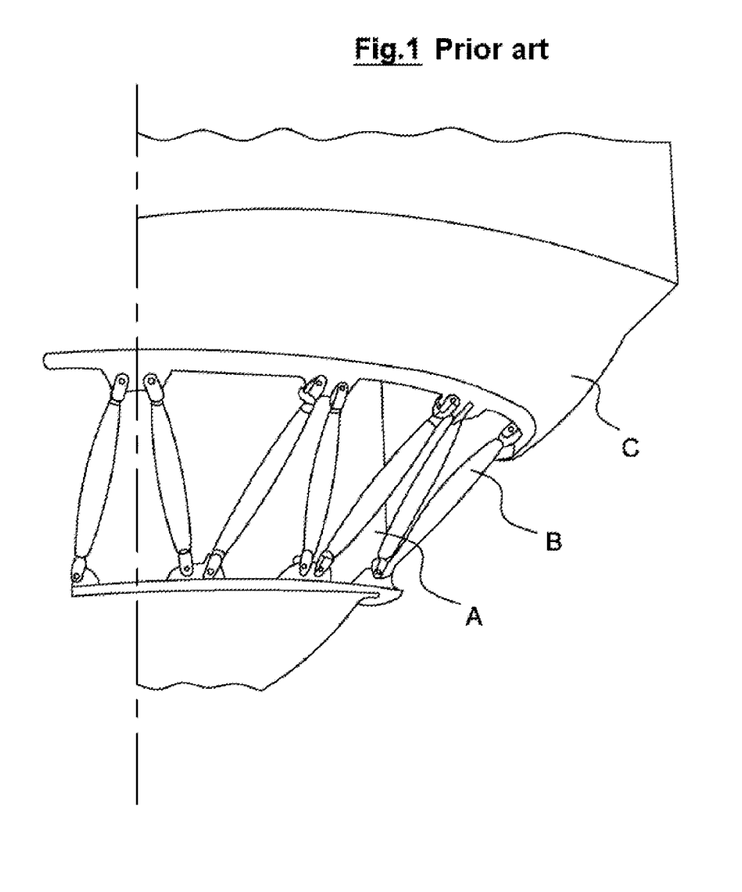
FIG. 1 is one example of the fixing of a launcher tank of the prior art.

These interface devices may be cones or link rod assemblies, as in the case of the inter-tank interface of the Ariane 5 cryogenic upper stage ESCA, as depicted in FIG. 1 which is a perspective half-view in which a tank A is restrained by link rods B on a structure C or may also be assemblies of connecting sheets.

These solutions entailing numerous connecting elements allow good distribution of load at the interfaces, but have the major disadvantages of a not-insignificant impact on the mass of the craft and the need for lengthy operation times for assembling and dismantling the interfaces.

Furthermore, the conventional launcher fixings are designed for forces essentially oriented along the axis of the tank, whereas for a spaceplane, the forces are not along this axis alone but also perpendicular to this axis and in terms of role. As a result, launcher solutions cannot be applied unmodified to an aircraft of the spaceplane type.

These interface devices are not, however, particularly well suited to compensating for the stresses induced by differential thermal expansions which are non-zero. Furthermore, they cause thermal losses that are not insignificant.

Finally, these devices are applicable very little if at all to installations in which the volume available for the supporting device is very small.

In the field of maritime transport, document U.S. Pat. No. 3,659,817 A describes a solution for supporting a cryogenic tank which consists of a set of fixings, at least 2×4 fixing elements, oriented tangentially to the skin of the cryogenic tank and perpendicular to the main axis thereof so as to avoid the generation of bending stresses in this same skin under the effect of the variations in orientation of the loads caused by the continuous motion of a ship at sea.

That document does not describe means suited to reacting the longitudinal loads along the tank main axis. Furthermore, the recurrent movements considered are of smaller amplitude by comparison with what a spaceplane for example might encounter between the aeronautical phase and the space phase, particularly when aeronautical certification requirements are taken into consideration. Finally, some of the support devices proposed for equalizing the stresses may prove highly penalizing in terms of mass when applied to rocket propulsion tanks. This is because this solution, like most of the solutions usually adopted for the maritime support of cryogenic tanks, essentially for liquid natural gas, is unable to optimize the entire tank+bearing structure+support elements mass package to the level required for the space or aeronautical domain. This is notably explained by the fact that the tanks used in maritime transport have a capacity of several hundreds of m3 and therefore dimensions of an order of magnitude greater than the tanks of a capacity of just a few m3 to which the presently disclosed embodiment relates. Likewise, thermal losses, which are negligible in comparison with the volumes transported in maritime transport, are no longer negligible on the scale of aeronautical craft and spacecraft.

In the field of the mounting of tanks in an airplane, documents U.S. Pat. No. 3,951,362 A and U.S. Pat. No. 3,979,005 A which apply to a toroidal tank describe support means which comprise supports for reacting shear forces distributed on the circumference of a cryogenic tank.

These supports consist of sheets of a curved shape to give them the flexibility needed to allow radial relative deformations and guarantee that they work purely in shear.

These supports, suited to tanks with toroidal bottoms, constitute just part of the support device which is more complex and requires either the addition in the airplane of a support structure of conical type, which is bulky and penalizing in terms of mass, or that the forces at the front of the tank be reacted on a pressurized end wall that is designed and engineered to perform this function and is therefore once again heavy and bulky.

SUMMARY

The use of cryogenic propellants to afford all or some of the propulsion of an aircraft, as is the case for example with a spaceplane that has a rocket motor for carrying out suborbital or orbital missions, entails the installation of dedicated tanks, preferably in the fuselage of this aircraft.

In the light of the prior art, the presently disclosed embodiment proposes a device for supporting and holding a tank in an aircraft and in particular a spaceplane, which adds little volume to the tank, which is suited to supporting and holding tanks confined in small volumes and which allows the tanks to be fitted/removed a number of times over the life of the aircraft.

The ratio of operational mass to dry mass to a first order governs the performance achievable by such craft, and so it is essential to design a device for installing cryogenic tanks in the fuselage that is as optimal as possible in terms of mass.

In the same spirit, any unused volume is to be proscribed, and the diameters of the cryogenic tanks are defined to be as close as possible to the diameters of the fuselage, thus placing great constraints on how interface components are arranged.

Be that as it may, it needs to remain possible for the latter to be inspected for each flight, and inspected easily, and likewise removed and refitted, something which is likely to occur at least a few times in the life of the airplane.

Still with the concern of guaranteeing the desired performance, the device needs in particular to minimize the evaporation of cryogenic propellants through thermal losses between the tanks and the bearing structure.

Finally, the cryogenic tanks' interface fixings need to be capable of meeting the conditions mentioned hereinabove without generating thermomechanical stresses caused by the differential expansions between the tanks and their surroundings, and in spite of the high acceleration loadings applied in varying directions. These fixings indeed need to meet the certification requirements which notably specify the accelerations that the structure needs to be able to withstand in the event of an emergency landing, and the particular profile of the orbital or suborbital missions which comprise a rocket-propulsion phase which nominally occurs on each flight.

One subject of the presently disclosed embodiment is a device for supporting tanks for the storage or transportation of cryogenic liquids in a fuselage of an airplane and/or spacecraft, including suborbital craft, that provides an answer to the problem set explained hereinabove.

This device allows all of the following:
- relatively quick and easy fitting and removal of the tanks confined to a very tight space, and quick inspection operations;
- limitation on the loads applied to the airplane structure and especially to the propellant tanks in spite of significant differential thermal expansions, notably high striction/shortening of the tanks subjected to the cryogenic temperatures and despite a highly varying loading profile: significant accelerations applied along the axis of the tank, for example during space propulsion phases, or at right angles to the axis of the tank, for example during conventional aeronautical phases with high vertical load coefficients or steep-descent phases;
- optimization of the attachment points coherent with the main axes and bearing structures of the airplane;
- minimization of the overall mass impact, at the attachment points as such, but also of the reinforcers needed at the level of the airplane structure and of the structural parts of the tanks; and
- an answer to the civil aviation certification requirements, particularly those relating to tolerance of breakdowns and those relating to safety in the event of sharp decelerations or emergency landings.

The tanks in question are particularly non-structural tanks of cylindrical or conical shape with spherical or elliptical ends.

They are equipped with structural fixing and reinforcing elements such as a skirt or hoops, capable of reacting the interface forces and located at the front and rear of the tank.

The device of the presently disclosed embodiment is for this purpose a device designed to restrain tanks for housing cryogenic propellants with a capacity of a few metric tonnes without subjecting them to stresses that oppose their longitudinal or radial contraction/expansion.

More particularly, the disclosed embodiment proposes a device for supporting and holding a tank of cylindrical or conical overall shape and of main axis X in a vehicle such as an aircraft, which comprises a pair of first tank-retaining means for retaining the tank along an axis Z perpendicular to the main axis X at each of a first and of a second end of the tank, a second means for retaining the tank along an axis Y perpendicular to the main axis X and to the axis Z, at the first end of the tank and a third retaining means designed to retain the tank along the axis X and the axis Y and connected to the second end of the tank.

Advantageously, the tank supporting and holding device further comprises a second means for retaining along the axis Y at the first end of the tank so as to constitute a redundant safety retaining means.

The first means and the second means advantageously consist of link rods fixed to the tank by means of pins free to rotate and arranged in such a way as to allow the tank to expand or contract freely.

According to one particular aspect, the first end of the tank, the link rods define three fixing points distributed at the top and the two sides of the first end of the tank.

The first means advantageously comprise four link rods arranged symmetrically with respect to planes of symmetry ZY and ZX of the tank and oriented along the axis Z in order to react tank accelerations on the axis Z.

According to one particular aspect, the fixing points of said four link rods to the tank are located in the plane of symmetry XY of the tank.

The second retaining means advantageously consists of a link rod at the front of the tank, positioned in the plane XY and reacting forces along the axis Y transverse to the main axis X of the tank.

The link rod positioned in the plane XY, and the link rods orientated along the axis Z, are advantageously positioned in such a way as to allow the tank deformations along the axis X while at the same time allowing the tank some radial travel so as not to generate stress caused by the radial thermal deformations of the tank.

The fixing point of the link rod positioned in the plane XY on the tank is advantageously in the plane of symmetry XZ of the tank.

The link rods are advantageously positioned in such a way as to work tangentially to the skin of the tank.

The disclosed embodiment applies in particular to an aircraft comprising a tank and a tank supporting and holding device according to the disclosed embodiment, for which the main axis X is a horizontal axis parallel to the aircraft axis, or at a small angle to the aircraft axis, the axis Y is a horizontal axis transverse to the aircraft and the axis Z is a vertical axis, the first and second means being held on frames of the fuselage of the aircraft.

The tank is advantageously suspended from the first retaining means.

The first and second retaining means advantageously are link rods fixed by ball-joints to attachments of the tank and attachments on frames of the aircraft, or on shock-absorbing webs between frames.

The third retaining means advantageously comprises a vertical fixing rod fixed to a structure of the aircraft and pushed into a sliding joint surrounded by a spherical ball at the end of a skirt secured to the tank, for which the structure provides for the transmission of force from the rod to the fuselage of the aircraft, and for which the sliding joint reacts force along the axes X and Y while at the same time being entirely free to rotate and free to effect a translational movement about the rod along the vertical axis Z.

According to one particular aspect, the aircraft comprises a safety redundancy of the third retaining means which, according to one particular aspect, is achieved by a peg/clearance hole device situated between the skirt, between the vertical pin and the tank, and a support fixed to the fuselage so as to restrain the tank in X and in Y upon breakage of the vertical pin or of the skirt on the tank side.

The aircraft advantageously a spaceplane and the tank is a cryogenic feed tank for a rocket engine of the spaceplane, the retaining means being configured to provide degrees of freedom suited to avoiding thermomechanical stresses under the effect of differential thermal deformations of the tank in the longitudinal and radial directions.

According to one advantageous aspect, the structure comprises a double flange.

BRIEF DESCRIPTION OF THE DRAWINGS

Other features and advantages of the disclosed embodiment will become apparent from reading the following description of one nonlimiting exemplary aspect of the disclosed embodiment accompanied by the drawings which depict.

DETAILED DESCRIPTION

Figure 2:
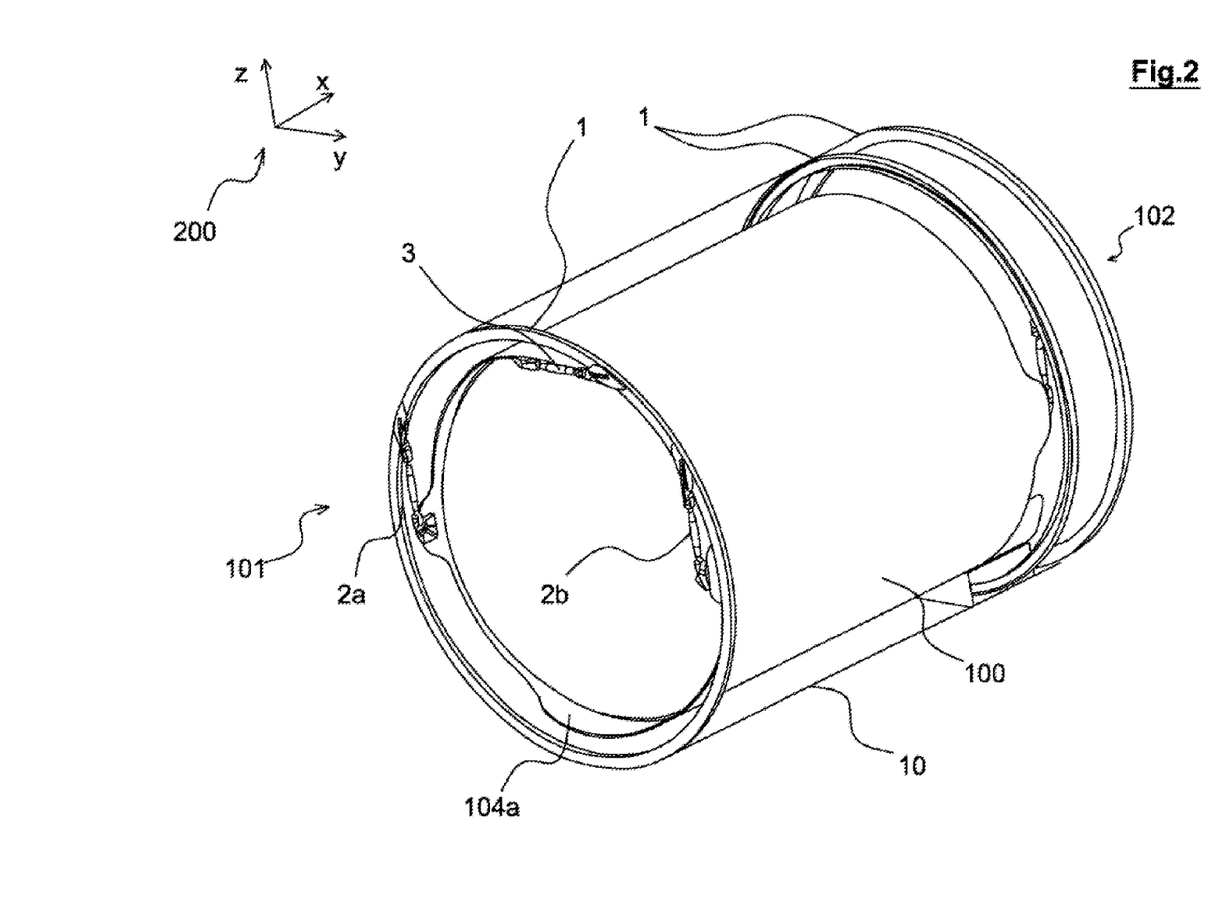
FIG. 2 is a three-quarters front perspective view of a tank with a supporting and holding device according to the disclosed embodiment.
Figure 3:
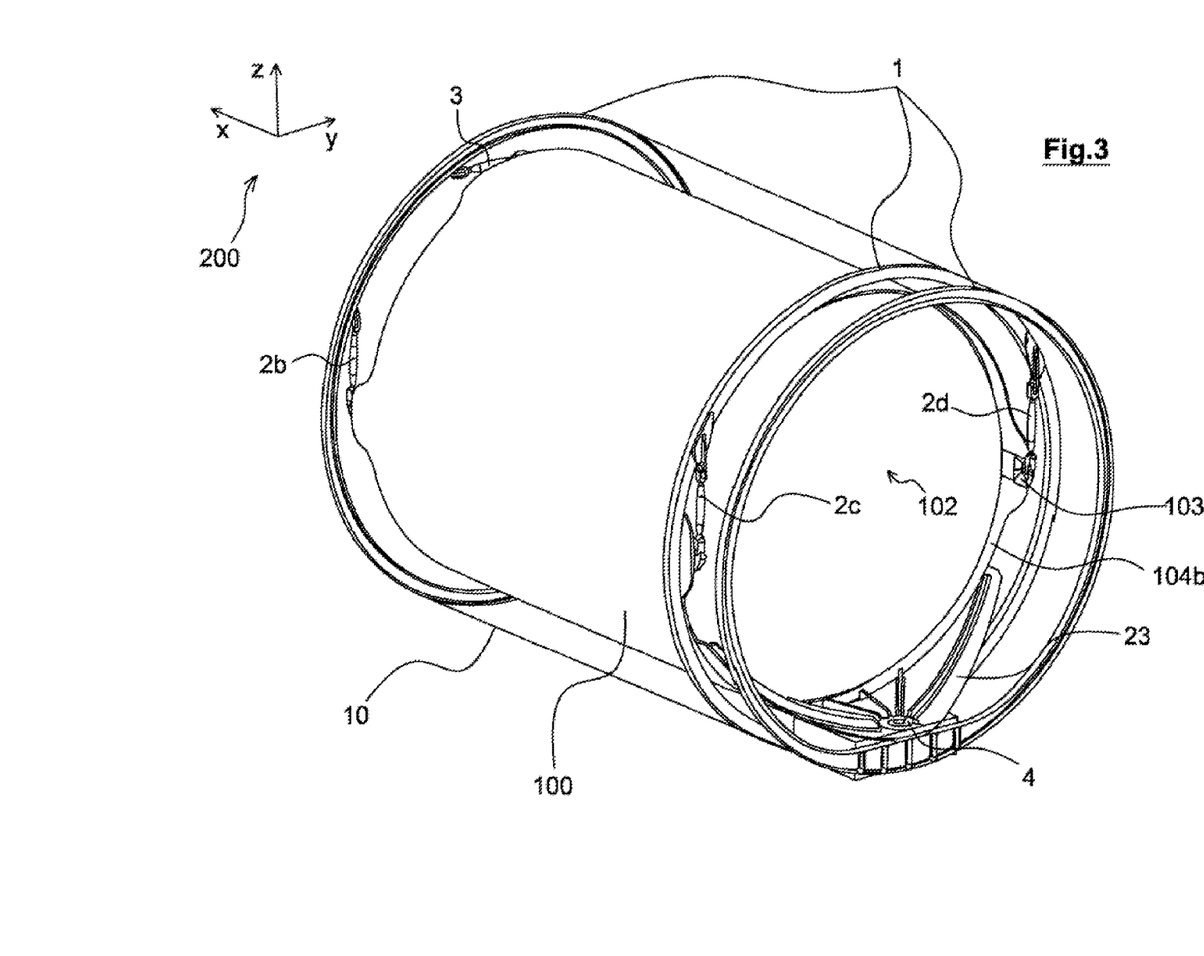
FIG. 3 is a three-quarters rear perspective view of a tank with a supporting and holding device according to the disclosed embodiment.

The disclosed embodiment relates to a device for supporting and holding a tank 100 as depicted in FIGS. 2 and 3, of cylindrical or conical overall shape and of main axis X, a horizontal axis corresponding to the main axis of the aircraft according to the disclosed embodiment.

The device in general comprises a number of tank retaining means, these means being divided into three groups: first means intended to support the tank, one or more second means intended to restrain one end of the tank in a lateral direction perpendicular to the main axis X, and a third retaining means creating an anchor point anchoring the tank with respect to the fuselage of the aircraft.

The device thus comprises, in the first place, a pair of first means 2a, 2b, 2c, 2d of retaining the tank along an axis Z at each of a first 101 and of a second 102 end of the tank. In the example, the axis Z is a vertical axis, the first means supporting the tank in the fuselage of the aircraft.

The first pair of first means 2a, 2b is depicted in FIG. 2 and the second pair 2c, 2d is depicted in FIG. 3. The first means 2a, 2b, 2c, 2d comprise four link rods 30 arranged symmetrically with respect to planes of symmetry ZY and ZX of the tank and oriented vertically in order to react accelerations of the tank along the vertical axis Z, the axis Y being a horizontal axis perpendicular to the axes X and Z.

Figure 5:
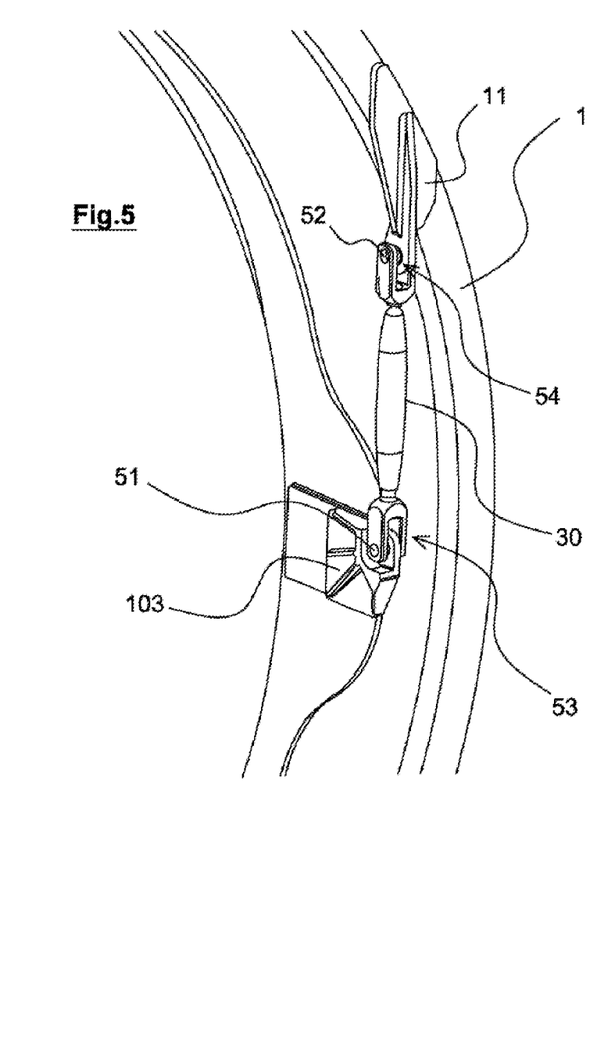
FIG. 5 is a detail of a retaining means according to the disclosed embodiment.

One example of a link rod 30 that can be applied to the first means is depicted in FIG. 5.

It comprises a body and two ball-joints 53, 54 which are respectively connected to an attachment 103 of the tank via a pin 51 and to an attachment 11 via a pin 52 on a frame 1 of the aircraft.

The link rods are positioned in such a way as to work tangentially to the skin of the tank 100 so as to avoid any puncturing of the tank which would be highly detrimental to its integrity.

The supporting elements of the link rod type need to have both good tensile and compressive strength in the wide variety of loading scenarios that may be encountered. On the other hand, they must not offer resistance at right angles to their working axis.

The attachments 103 according to the example are made on hoops 104 at the periphery of the ends 101, 102 of the tank.

Returning to FIGS. 2 and 3, the fixing points of said four link rods 30 to the tank 100 are located in the plane of symmetry XY of the tank according to the orthonormal frame of reference 200.

Still according to FIG. 2, the device of the disclosed embodiment comprises, at the first end 101 of the tank, a second means 3 of retaining the tank along a horizontal axis Y perpendicular to the main axis.

The second retaining means 3 which will serve to prevent the tank from rotating about the axis Z and from moving in Y at its first end consists, according to the example, of a high link rod at the front of the tank 100, positioned in the plane XY and reacting forces along the axis Y transverse to the main axis X of the tank 100.

The high link rod positioned in the plane XY is oriented in such a way as to allow the tank to deform along the axis X while at the same time allowing the tank some radial travel so as not to generate stresses caused by the radial thermal deformations of the tank. Finally, the point of attachment of the high link rod to the tank is in the plane of symmetry XZ of the tank.

It should be noted that the first means comprising the first link rods prevent the tank from rotating about its axis.

Figure 4A:
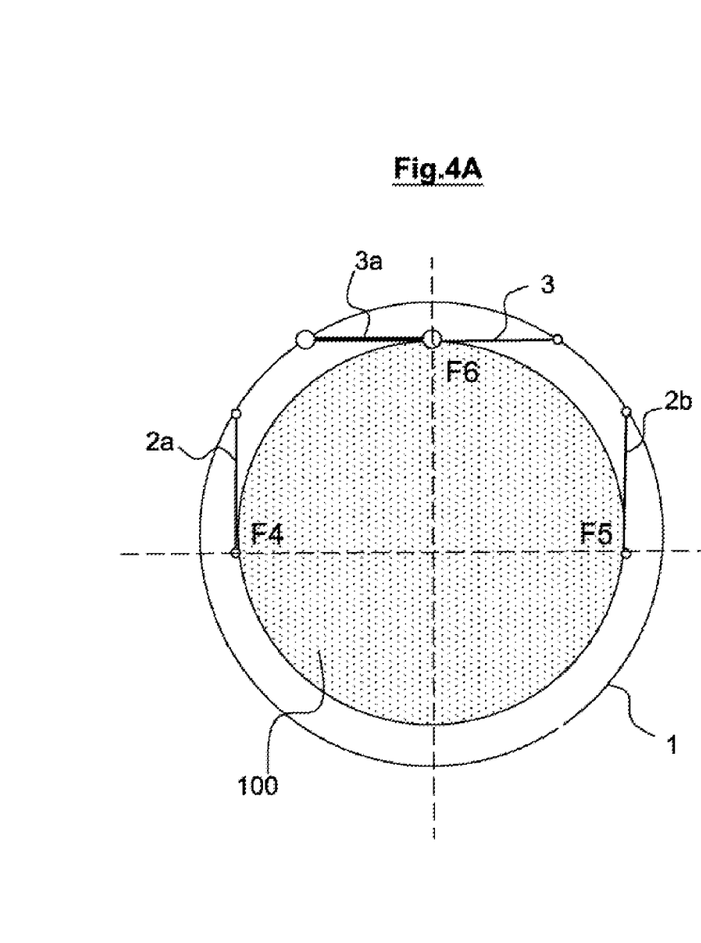
FIGS. 4A and 4B are schematic views of the fixings at a first end of the tank according to two particular aspects of the disclosed embodiment.
Figure 4B:
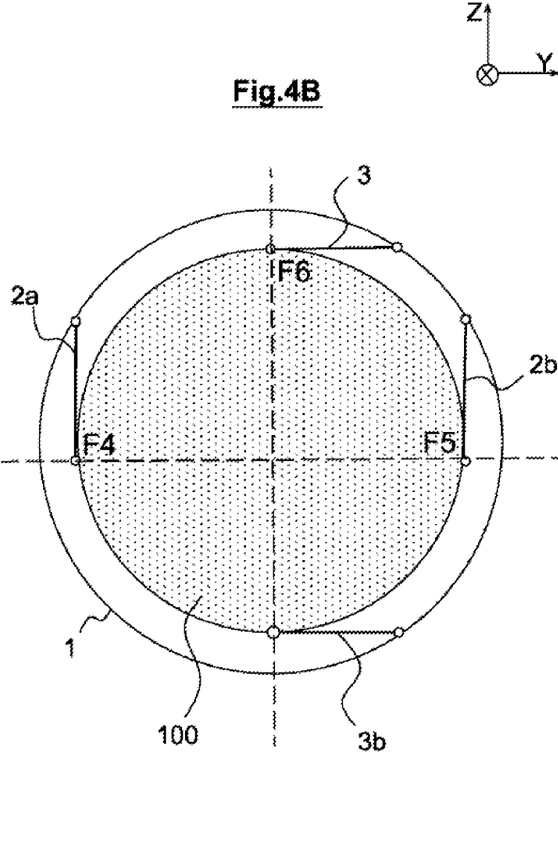

From a functional standpoint, at the first end of the tank, the link rods 30 of the first and second support means define three fixing points distributed at the top and the two sides of the first end 101 of the tank as depicted in FIGS. 4A and 4B.

This collection of fixing points allows the front of the tank to move longitudinally along the axis X as it expands/contracts.

In order to perform a failure-tolerant or safety function (a failsafe function) in the event of failure, a second support means may also be added to create redundancy in the event of the high link rod or its fixing points breaking.

This means may either be a second high link rod 3a as in FIG. 4A, or a low link rod 3b as in FIG. 4B and will be positioned on the same side of the tank as the second means in the case of the example depicted.

As far as the first retaining means from which the tank is suspended are concerned, the presence of two pairs of means is intrinsically redundant because if one link rod breaks, the remaining three link rods are enough to retain the tank along the axis Z.

The first means are thus arranged symmetrically with respect to the planes of symmetry ZY and ZX of the tank and oriented vertically to react accelerations along the axis Z. To limit loading to a minimum, the fixing points at which the link rods are fixed to the tank are located in the plane of symmetry XY of the tank. The link rods comprise balls at each of their ends in the region of the attachment to the tank and in the region of the attachment to the bearing structure, to allow for differential thermal expansions. Their orientation prioritizes relative deformations in the longitudinal direction but also allows enough travel that stresses are not generated as a result of radial thermal deformations. These 4 link rods constitute an assembly that is tolerant of failure with regard to the reaction of forces along the axis Z.

The device is thus made up of a set of link rods provided with ball-joint fixings, in limited number, arranged in such a way that the setup is as isostatic as possible while at the same time affording redundancy in the transmission of force.

The device is supplemented at the second end of the tank by a third retaining means with ball-joint 4 about the vertical axis connected to the second end 102 of the tank.

Figure 6:
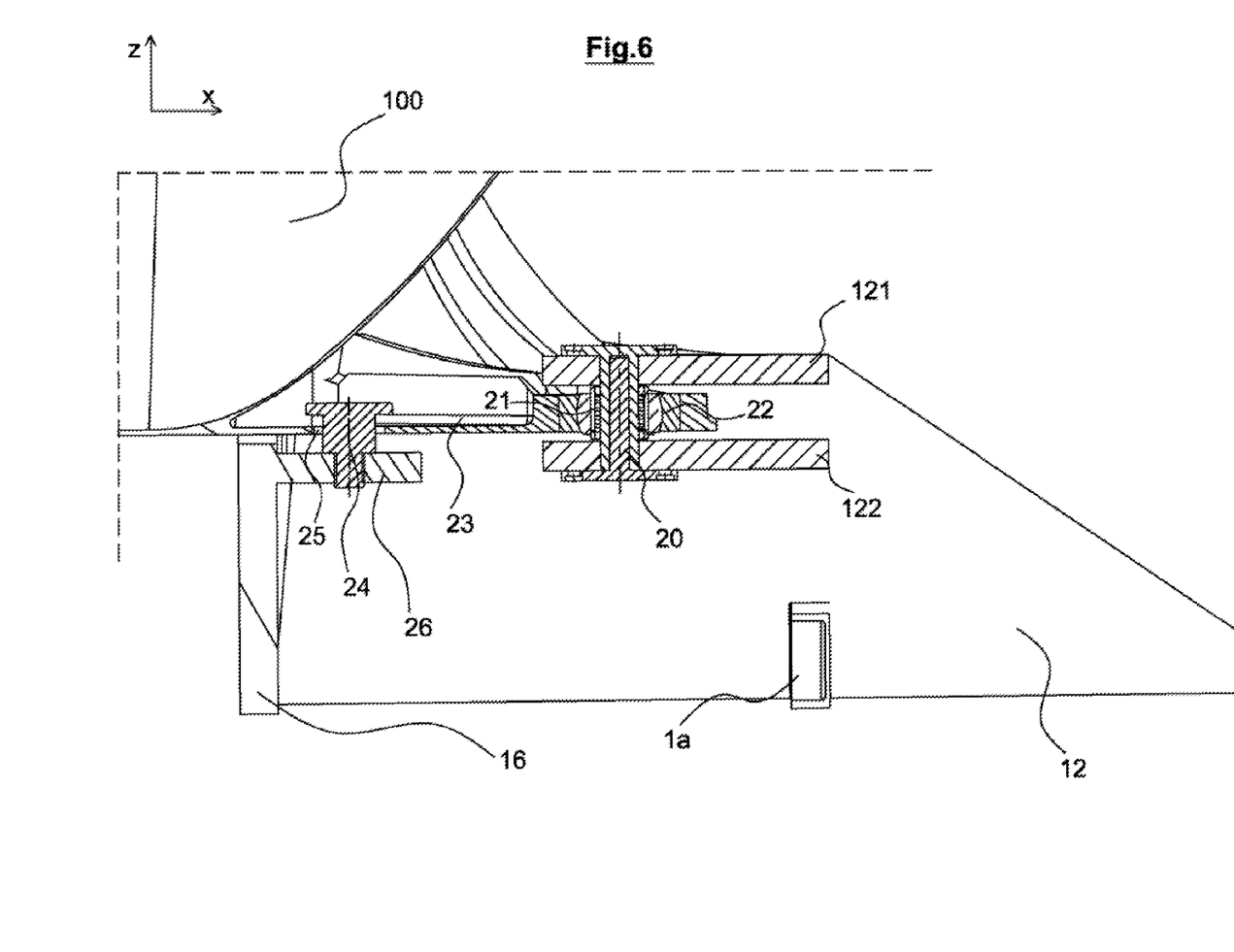
FIG. 6 is a view in longitudinal section of a detail of a third retaining means with ball-joint of the disclosed embodiment.

This spherical ball-joint retaining means which alone reacts all of the force in the airplane direction is more particularly depicted in FIG. 6.

This retaining means or device is intended to restrain the tank in a direction X along the main fore-aft axis of the aircraft and along the axis Y perpendicular to the axis X.

This means supplements the second means to restrain the tank laterally and creates an anchor point for the tank in the longitudinal direction X of the aircraft.

According to the example depicted and as will be explained hereinbelow, this retaining means is produced using a retaining device which has a degree of freedom to rotate about this axis X, a degree of freedom to effect translational movement along an axis Z perpendicular to the plane of the wing structure of the aircraft, and a degree of freedom to rotate about said axis Z.

This third retaining means constitutes a point on the tank that is fixed in terms of X with respect to the airplane whereas the first and second means are produced in such a way as to expand or contract with the tank.

The forces along the axis Y are reacted by the high link rod 3 positioned horizontally at the front and a rod 20 positioned at the bottom rear part of the tank.

Flight forces in the X direction are reacted at the third retaining means formed by a single attachment point consisting of the rod 20 positioned at the bottom rear part of the tank.

This attachment point is the only fixed point on the tank with respect to the longitudinal axis X so that the significant differential thermal expansions between the tank and the airplane structure are permitted at the other attachments without generating thermomechanical stresses on the tank or on the attachment points.

The third retaining means comprises the vertical rod 20 fixed to a structure 12 of the airplane and pushed into a sliding joint 21 surrounded by a spherical ball 22 at the end of a skirt 23 secured to the tank 100.

The structure transmits force from the pin into the fuselage of the airplane and the vertical pin reacts force on the axes X and Y while being at the same time free to rotate and to effect a translational movement along Z between end stops.

The rod 20 opposes a translational movement of the tank along the axes X and Y, the retaining means on the other hand being supplemented by a ball-joint connection which connects the tank to the vertical rod in terms of translation but offers it three degrees of freedom for the three rotations thus decoupling the tank from this first retaining means in pitch, roll and yaw.

To summarize, the fixing rod 20 is pushed into a sliding joint 21 surrounded by a spherical ball 22 at the end of a skirt 23 secured to the tank 100, the structure transmits force from the rod into the fuselage of the airplane and the sliding and ball-joint connection reacts force along the horizontal axes X and Y or in a plane parallel to the plane of the wing structure of the aircraft while at the same time having freedom to rotate and effect a translational movement about the rod 20 along the vertical axis Z perpendicular to the plane of the wing structure of the aircraft.

Figure 7A:
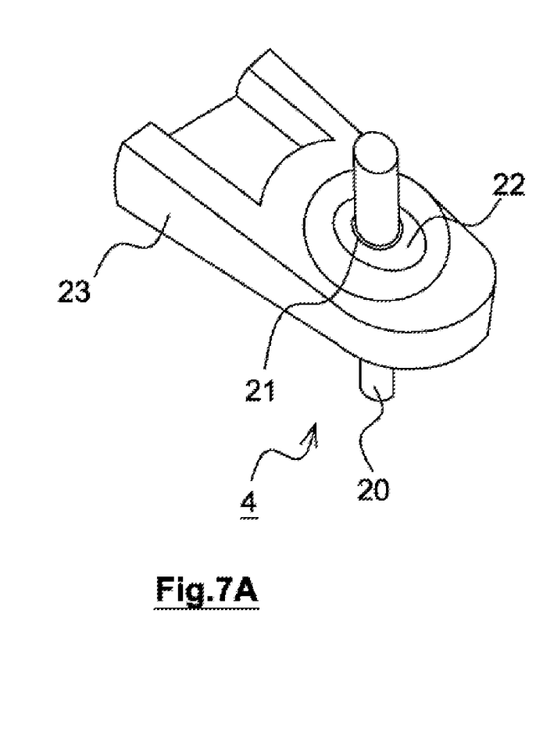
FIGS. 7A and 7B are views of the retaining means of FIG. 6 in perspective and in an exploded view, respectively.
Figure 7B:
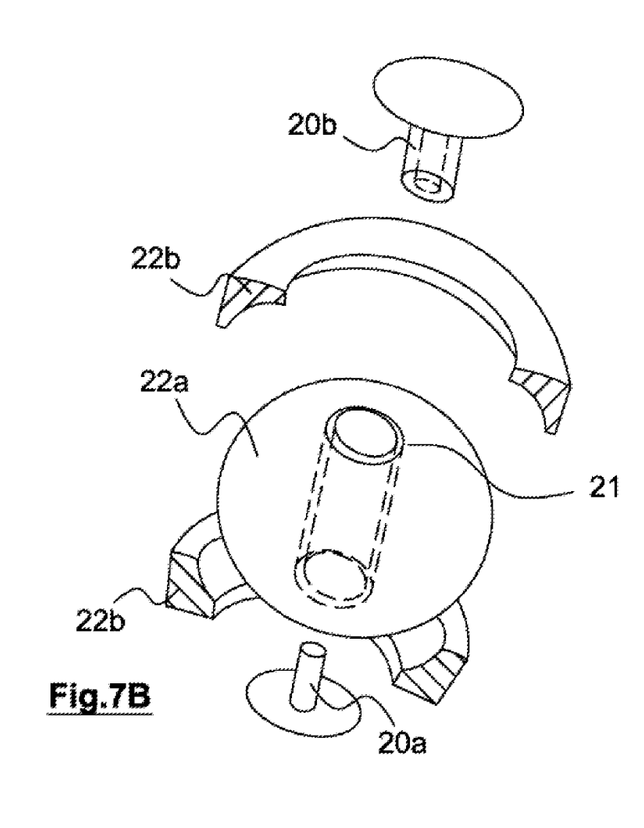

FIGS. 7A and 7B detail the articulated means depicted in FIG. 6.

FIG. 7A depicts the positioning of the pin 20 in a bearing that forms a sliding joint 21 whereas in FIG. 6, the sliding joint 21 depicted is rather a connection involving rolling balls. The bearing is inserted in the ring of spherical exterior profile 22a of the ball-joint 22.

FIG. 7B details one exemplary aspect of the spherical ball-joint comprising the ring with a spherical exterior profile 22a housed in a way known per se in an outer cage 22b with a spherical interior profile, here in the known form of a lower annulus and of an upper annulus. The outer cage 22b in which the spherical ball-joint is mounted is received in a housing made in the skirt 23 secured to the tank.

In some way the tank may be considered to be attached to the rod 20 while at the same time being able to pivot in all directions about its point of attachment, the point of attachment furthermore being able to slide along the rod. The retaining device is thus designed to create a point of anchoring the tank to the aircraft, complementary retaining means here produced by the link rods of the first and second means keeping the tank aligned with the fuselage of the aircraft.

The link rods which are fixed to the tank and to the fuselage by means of pins free to rotate are arranged in such a way as to allow the tank to expand or contract freely.

The failsafe nature of this connection is guaranteed by safety redundancy of the third retaining means created by producing the rod 20 in the form of a double pin comprising an outer part and an inner part such that if the outer part of the pin should break, the inner part would still be able to react shear forces.

FIG. 7B is a perspective depiction of the double pin which comprises the internal rod 20a and external tube 20b which are concentric and pushed one inside the other.

Furthermore, a peg 24 enters, with clearance, a hole 25 situated on the skirt 23, between the vertical rod 20 and the tank, the peg being inserted in a support 26 fixed to the fuselage so as to restrain the tank in X and Y in case the skirt 23 breaks on the tank side.

The structural structure 12, which constitutes the support for the connection on the fuselage side and which may potentially be produced in the form of a box section, comprises two flanges 121, 122, each one capable of reacting all of the force of the rod 20, thereby also contributing to the safety of the device.

On the airplane structure side, the solution requires few if any dedicated structural elements, the structure relying on frames 1 of the fuselage 10.

Returning again to FIG. 5, the link rods are attached to existing frames or between two frames on additional shock-absorbing webs or additional frame portions.

The ideal is of course to position the frames when designing the architecture of the airplane structure so that these frames coincide with the interfaces with the tanks, giving rise to a coherent airplane/tank structure design.

Note that this system offers a great deal of flexibility regarding the positioning of the tanks in the fuselage. The tanks are not for example constrained to being situated near a pressurized end wall or any other strong structure.

According to the configuration adopted, the retaining means have an optimal arrangement for a tank, the main loading scenarios of which are accelerations in the direction transverse to the tank and downwards and accelerations in the longitudinal direction of the tank. It is also possible to design the system with Z link rods operating in compression at least at one end of the tank. Nevertheless, this aspect is not as optimal.

According to the example, the first end of the tank is positioned at the front of the airplane and the second end at the rear and the relative positioning of the second means 3 and of the third means 4, one at the top at the front, one at the bottom at the rear with respect to the airplane, is optimal for equalizing radial forces and limiting induced moments. However, the reverse configuration is nonetheless possible.

Like the vertical link rods, the high link rod of the second means is provided with ball-joints at its two ends and oriented in such a way as to prioritize relative deformations in the longitudinal direction while at the same time providing sufficient travel so that stresses are not generated as a result of the radial thermal deformations. For optimum behavior, the point at which this link rod is fixed to the tank needs to lie in the plane of symmetry XZ of the tank.

The collection of measures described hereinabove make it possible to limit the loadings both in the tank and in the airplane structure, and in the fixings themselves. The overall mass is thus itself optimized.

The arrangement, number and design of the attachments ensures a configuration which is safeguarded overall in the event of failure (a failsafe configuration).

Limiting the number of attachments, and the simplicity of the attachments, moreover makes for rapid and easy operations of incorporating the tanks into the fuselage or removing them for maintenance operations, even in the case of tank diameters close to the fuselage diameter. For this same reason, inspection is facilitated via a number of carefully positioned inspection hatches and can be carried out as often as necessary, for each flight if required.

The tank is notably a cryogenic tank supplying a rocket motor of the spaceplane, the retaining means being configured to provide degrees of freedom suited to avoiding thermomechanical stresses under the effect of differential thermal deformations in the longitudinal direction, shortening of the tank, and radially with respect to the tank, notably the striction of the tank.

The limited number of points of attachment between the cryogenic tank and the bearing structure, which is furthermore of small size, finally makes it possible to limit exchanges of heat between these two elements.

The device of the disclosed embodiment offers optimization of the overall mass across the entire tank, airplane structure and support assembly. This device also affords an appreciable reduction in time spent on maintenance and tank removal by reducing the number of interfaces with the tank to the bare minimum.

This device furthermore ensures that the tank fixings will not impose stresses on the tank as it expands and contracts as a function of its temperature.

The disclosed embodiment is not restricted to the example depicted and notably the orientation of the link rods can vary according to the orientation of the main design forces specific to the craft in question and to the flight profile thereof.

What is claimed is:

1. A supporting and holding device for a tank of a cylindrical or conical overall shape and of a main axis X in a vehicle, comprising:
    two pairs of first tank-retaining means for retaining the tank along an axis Z perpendicular to the main axis X, one of the two pairs of first tank-retaining means being joined to the tank at a first end of the tank and another of the two pairs of first tank-retaining means being joined to the tank at a second end of the tank,
    a second tank-retaining means for retaining the tank along an axis Y perpendicular to the main axis X and to the axis Z at the first end of the tank, and
    a third tank-retaining means designed to retain the tank along the axis X and the axis Y and connected to the second end of the tank,
    wherein the two pairs of first tank-retaining mans provide a degree of freedom to the tank in the X and Y axis, the second tank-retaining means provide a degree of freedom to the tank in the X and Z axis and the third tank-retaining means provide a degree of freedom to the tank in the Z axis.

2. The supporting and holding device as claimed in claim 1, further comprising at least one further second means for retaining said tank along the axis Y at the first end of the tank so as to constitute a redundant safety retaining means.

3. The supporting and holding device as claimed in claim 2, wherein said at least one further second tank-retaining means along the axis Y consist of link rods fixed to the tank by means of pins free to rotate and arranged in such a way as to allow the tank to expand or contract freely.

4. The supporting and holding device as claimed in claim 2, wherein at the first end of the tank the pair of first tank-retaining means, the second tank-retaining means and the further second tank-retaining means are made of link rods and provide four fixing points distributed at a top, a bottom, and two sides of the first end of the tank, said first end of the tank being fixed by the respective pair of first tank-retaining means, the second tank-retaining means, and the further second tank-retaining means alone.

5. The supporting and holding device as claimed in claim 1, wherein said two pairs of first tank-retaining means and said second tank-retaining means consist of link rods fixed to the tank by means of pins which are free to rotate and arranged in such a way as to allow the tank to expand or contract freely.

6. The supporting and holding device as claimed in claim 5, wherein, at the first end of the tank the two pairs of first tank-retaining means and the second tank-retaining means made of link rods provide three fixing points distributed at a top or bottom and two sides of the first end of the tank, said first end remaining free of other fixing points.

7. The supporting and holding device as claimed in claim 5, wherein said link rods are positioned in such a way as to work tangentially to the skin of the tank.

8. The support and holding device as claimed in claim 5, wherein at the second end of the tank the pair of first tank-retaining means are made of link rods distributed at two sides of the second end of the tank while the third tank-retaining means provide an additional fixing point at a bottom of said second end, said first end of the tank being fixed by the respective pair of first tank-retaining means and the second tank-retaining means alone.

9. The supporting and holding device as claimed in claim 8, wherein at the first end of the tank the pair of first tank-retaining means and the second tank-retaining means made of link rods provide three fixing points distributed at a top and two sides of the first end of the tank, said first end of the tank being fixed by the respective pair of first tank-retaining means and the second tank-retaining means alone.

10. The supporting and holding device as claimed in claim 1, wherein said two pairs of first tank-retaining means at each respective first and second end of the tank are made of four link rods arranged symmetrically with respect to planes of symmetry ZY and ZX of the tank and oriented along said axis Z in order to withstand tank accelerations on said axis Z.

11. The supporting and holding device as claimed in claim 10, wherein the fixing points of said four link rods on the tank are located in a plane of symmetry XY of the tank.

12. The supporting and holding device as claimed in claim 1, wherein said second tank-retaining means consists of a link rod at the first end of the tank, positioned in the axis Y and withstanding forces along the axis Y transverse to the main axis X of the tank.

13. The supporting and holding device as claimed in claim 12,
wherein said two pairs of first tank-retaining means at each respective one of the first and the second end of the tank are made of four link rods, arranged symmetrically with respect to planes of symmetry ZY and ZX of the tank and oriented along said axis Z, provide all retaining means the Z axis, and
wherein the link rod positioned in the axis Y and the link rods oriented along said axis Z, are positioned such a way as to allow the tank deformations along the axis X while at the same time allowing radial travel of the tank so as not to generate stress caused by radial thermal deformations of the tank.

14. The supporting and holding device as claimed in claim 12, wherein a fixing point on the tank of said link rod in the Y axis is in the plane of symmetry XZ of the tank.

15. An aircraft comprising a tank and a tank supporting and holding device as claimed in claim 1, wherein
said main axis X is a substantially horizontal axis substantially parallel to the aircraft axis,
said axis Y is a horizontal axis transverse to the aircraft, and
said axis Z is a vertical axis,
said two pairs of first tank-retaining means and said second tank-retaining means being held on frames of a fuselage of the aircraft.

16. The aircraft as claimed in claim 15, wherein the said tank is suspended from said two pairs of first tank-retaining means.

17. The aircraft as claimed in claim 15, wherein said two pairs of first tank-retaining means and said second tank-retaining means are link rods fixed by ball-joints to attachments of the tank and attachments on said frames of the aircraft, or to shock-absorbing webs between said frames.

18. The aircraft as claimed in claim 15,
wherein said third tank-retaining means comprises a vertical fixing rod fixed to a structure of the aircraft and fitted into a sliding joint surrounded by a ball-joint at an end of a skirt secured to said tank,
wherein said structure transmits forces from the rod to the fuselage of the aircraft, and
wherein said sliding joint withstands forces along the axes X and Y while at the same time being entirely free to rotate and free to effect a translational movement about the rod along the vertical axis Z.

19. The aircraft as claimed in claim 18, comprising a safety redundancy of the third tank-retaining means.

20. The aircraft as claimed in claim 19, wherein said safety redundancy is achieved by a peg clearance hole device situated on the skirt, between the vertical fixing rod and the tank, and on a support fixed to the fuselage so as to restrain the tank in X and in Y in case of breakage of the vertical pin or of the skirt on the tank side.

21. The aircraft as claimed in claim 18, wherein said structure comprises a double flange.

22. The aircraft as claimed in claim 15, wherein said aircraft is a vehicle that operates as an aircraft in air and as a spacecraft in space and said tank is a cryogenic feed tank for a rocket engine of such vehicle, the first, second, and third tank-retaining means being configured to provide degrees of freedom suited to avoiding thermomechanical stresses under the effect of differential thermal deformations of the tank in the longitudinal and radial directions.

* * * * *